United States Patent
Robinson et al.

[15] 3,662,085
[45] May 9, 1972

[54] MOUNTING BRACKET FOR SWITCH OR RECEPTACLE

[72] Inventors: Daniel E. Robinson, Metuchen; Solomon Rubinstein, Fanwood, both of N.J.

[73] Assignee: General Cable Corporation, New York, N.Y.

[22] Filed: Mar. 12, 1971

[21] Appl. No.: 123,715

[52] U.S. Cl. .................................. 174/48, 174/57, 174/58, 248/27, 339/126
[51] Int. Cl. ......................................................... H02g 3/18
[58] Field of Search .................. 174/48, 58, 57, 53; 220/3.6, 220/3.5, 3.4, 3.3, 3.7; 200/168 C, 168 D; 248/DIG. 6, 27; 339/125, 126, 132, 133, 134

[56] References Cited

UNITED STATES PATENTS

| | | | |
|---|---|---|---|
| 1,519,735 | 12/1924 | Kruse | 248/DIG. 6 |
| 2,091,773 | 8/1937 | Travers | 339/134 X |
| 2,309,189 | 1/1943 | Hancock | 220/3.7 UX |
| 3,446,467 | 5/1969 | Bailey et al. | 248/27 |

*Primary Examiner*—Lewis H. Myers
*Assistant Examiner*—D. A. Tone
*Attorney*—Sandoe, Hopgood & Calimafde

[57] ABSTRACT

This electrical fitting, such as a wall outlet or a switch, has a housing that extends through an opening in a wall and has flange means that extend beyond the sides of the opening across the front of the wall to prevent the housing from being pushed through the opening. A bracket fits around the housing and is adjustable along the housing from front to back; and the bracket has a flange that contacts with a back surface of the wall. Complimentary locking means on confronting surfaces of the housing and the bracket selectively engage with one another at different positions of the bracket or accommodating the bracket to walls of different thickness.

10 Claims, 11 Drawing Figures

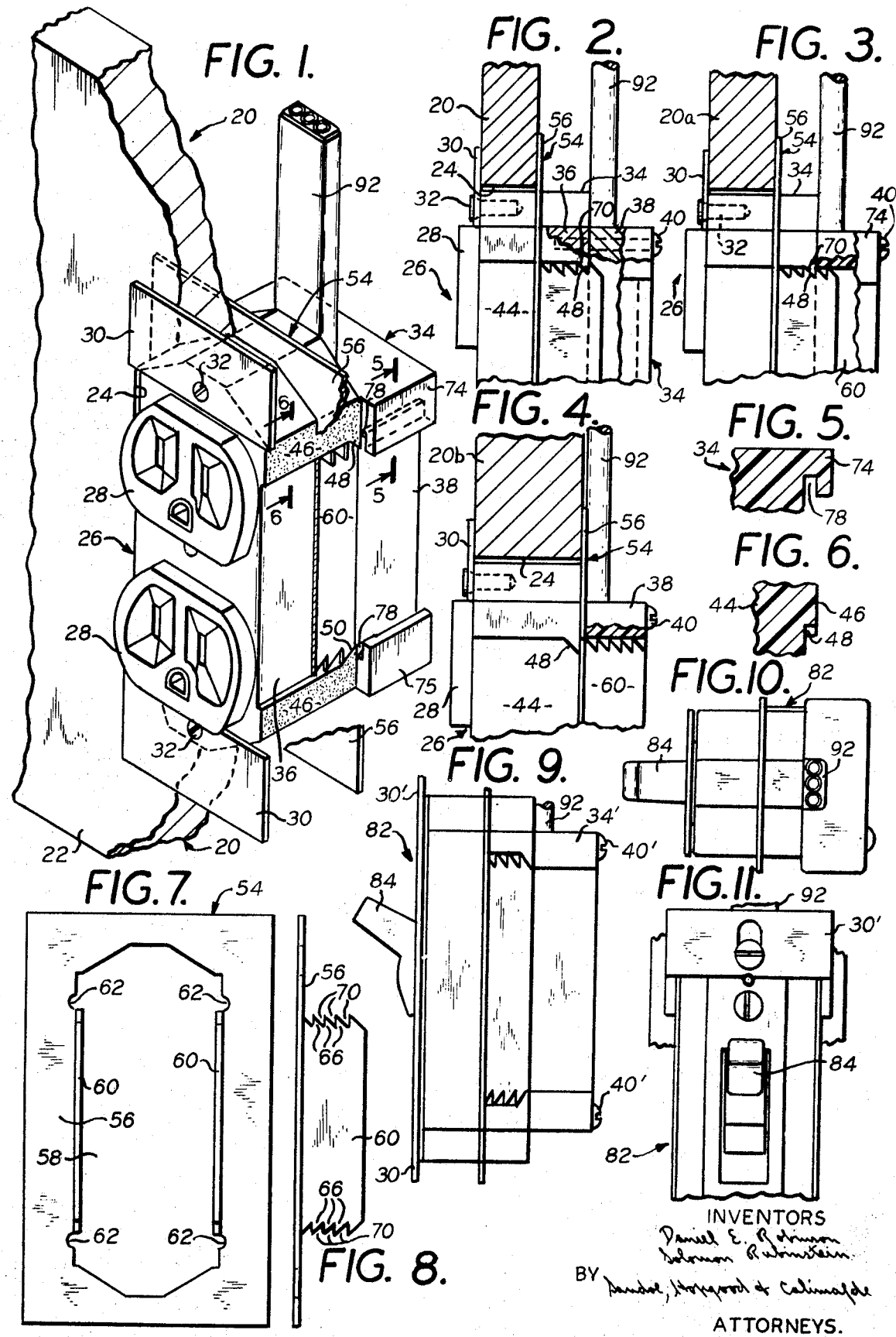

MOUNTING BRACKET FOR SWITCH OR RECEPTACLE

BACKGROUND AND SUMMARY OF THE INVENTION

This invention relates to constructions for mounting electrical fittings in a wall. It is used for wall outlets and also for switches and is intended primarily for use with pre-fabricated wiring harnesses for factory made homes, though not limited to such uses.

The invention will be described in connection with an outlet and a switch which are themselves of novel construction but they are described in other patent applications and the present invention relates to novel mounting means for connecting these fittings with walls of different thickness. The mounting means include a bracket that fits around the housing of the outlet or switch and that is adjustable on the housing from front to back. The bracket has a flange that projects beyond the housing and across a back surface of the wall and has complementary locking means on confronting surfaces of the housing and the bracket that selectively engage one another at different adjusted positions of the bracket or accommodating the bracket to different wall thicknesses.

More specifically, the bracket consists of a metal stamping having an outer flange portion that contacts with the back of the wall in which the housing is installed; and the bracket has side walls that extend along the side walls of the housing and adjacent to the housing. Shoulders along the upper and lower edges of the side walls of the bracket engage projections from the side walls of the housing to hold the bracket against movement relative to a flange means that contact with the surface of the front of the wall so that the assembly is clamped to the wall.

The walls of the bracket have sufficient flexibility so that they can be spread to disengage from the projections on the housing when adjustments are to be made for different wall thickness. The housing has a detachable back portion that holds the side walls from disengagement after a final adjustment has been made.

The invention is particularly useful for pre-fabricated wiring of harnesses for factory built homes using dry wall but it can be used advantageously with conventional on-site methods of construction.

Other objects, features and advantages of the invention will appear or be pointed out as the description proceeds.

BRIEF DESCRIPTION OF DRAWINGS

In the drawing, forming a part hereof, in which like reference characters indicate corresponding parts in all the views.

FIG. 1 is a fragmentary isometric view showing an electrical fitting made in accordance with this invention and installed in an opening through a wall;

FIGS. 2, 3, and 4 are diagrammatic sectional views showing the construction of the FIG. 1 with adjustment for different wall thicknesses;

FIG. 5 is an enlarged sectional view taken on the lines 5—5 of FIG. 1;

FIG. 6 is a fragmentary sectional view taken on the lines 6—6 of FIG. 1;

FIG. 7 is an enlarged front view of the bracket shown in fragmentary illustration in FIG. 1;

FIG. 8 is a side view of the bracket shown in FIG. 7;

FIG. 9 is a side elevation of a switch with the mounting means of this invention;

FIG. 10 is a top plan view of the switch shown in FIG. 9; and

FIG. 11 is a fragmentary view showing a portion of the front of the switch shown in FIGS. 9 and 10.

DESCRIPTION OF PREFERRED EMBODIMENT

FIG. 1 shows a wall 20 made with a dry wall panel and having a front surface 22. There is an opening 24 through the wall 20 of a shape to freely receive an outlet fitting 26 which has two outlets 28 in its front face and which has flange means 30 connected to its front face above and below the outlet sockets 28 by screws 32 or other fastening means. These flange means 30 extend across the front surface of the wall 20 beyond the opening 24 and they prevent the outlet fitting 26 from being pushed through the opening 24. They maintain the front of the outlet fitting 26 substantially flush with the front surface 22.

The outlet fitting 26 includes a housing 34 which consists of a front portion 36 and a back portion 38. The back portion 38 is detachably secured to the front portion 36 by screws 40 (FIG. 2); and there are screws 40 at the upper and lower ends of the outlet fitting. These screws are merely representative of detachable fastening means of holding the forward and back portions of the housing 34 in assembled relations.

The front portion 36 has side walls 44. The side wall at the right hand side of the housing is shown in FIG. 1 and it will be understood that there is a similar side wall on the opposite side of the housing. At the upper and lower end of the side walls 44 there are surfaces 46 which project out somewhat from the rest of the side wall and these surfaces 46 are stippled in FIG. 1 in order to make their extent more apparent. For most of their length, the surfaces 46 have confronting edges which are parallel but near the rearward end of the upper surface 46 there is a projection 48 which extends downward in the form of a sawtooth having a vertical face which coincides with the rearward end of the front portion 36. The lower surface 46 has a similarly shaped projection 50 which extends upward in contrast to the downward extent of the projection 48.

A bracket 54 fits around the front portion 36 of the housing. This bracket is best shown in FIGS. 7 and 8. It has a flange 56 which extends all around the perimeter of the bracket and there is an opening 58 through the bracket of a size to fit freely around the housing of the outlet fitting. The opening 58 is shaped to the outside of the housing of the outlet fitting and there are side walls 60 on each side of the opening 58 for most of the height of the opening. These side walls 60 terminate at recesses 62 shown in FIG. 7. In the preferred construction, the bracket 54 is a metal stamping and the side walls 60 are struck from material displaced in making the opening 58.

FIG. 8 shows one of the side walls 60. At both the upper and lower ends of this side wall there are edges which are shaped with sawteeth configurations, the sawteeth being indicated by the reference characters 66. The sawteeth 66 are shaped so that they have vertical faces on one side facing away from the flange 56.

Between the sawteeth 66 there are spaces 70 which have shapes complementary to those of the sawteeth 66. These spaces 70 are of the same shape as the projections 48 and 50 (FIG. 1) extending from the side walls 44. These projections 48 and 50 can extend into any one of the spaces 70 depending upon the adjustment of the bracket 54 forward or rearward on the housing of the outlet fitting.

FIG. 2 shows the projection 48 engaged in the space 70 which is furthest from the flange 56 and with the bracket in this position on the housing 34, the assembly is adjusted for the thinnest wall 20 which the assembly can accommodate.

FIG. 3 shows the bracket 54 moved further back on the housing 34 so that the projection 48 extends into a space 70 of the bracket which is closer to the flange 56. This locates the flange 56 further back from the front of the housing 34 and thus permits the assembly to be used with a wall 20a which is thicker than the wall 20 of FIG. 2. The spaces 70 are dimensioned so that they are separated by distances equal to the differences in standard gauge wall panels. For example, with the projection 48 in the last space 70, as shown in FIG. 2, the assembly may clamp against opposite sides of a wall 20 which is one-half inch thick. With the projection 48 in the next space 70, as shown in FIG. 3, the space between the front flange 30 and the bracket flange 56 may be five-eighths inches, this being the next standard thickness for dry wall panels. It will be understood that the bracket can be designed to adjust and lock in positions corresponding to any thicknesses of wall for which the invention is intended to be used.

The spaces 70 and the teeth that form them, together with the projections 48,50 of the housing 54, are representative of confronting faces of the bracket and housing with complementary lock for selectively engaging one another at different adjusted positions of the bracket to accommodate the bracket to different wall thicknesses. It will be evident that constructions differing in shape and correlation can be used to obtain results equivalent to those illustrated in FIGS. 2 and 3.

Referring again to FIG. 1, the back portion 38 of the housing 34 has the same width as the forward portion 36 for most of its height but it does have a wider upper part 74 and a wider lower part 75 which extend on both sides beyond the side walls 44 of the housing 34. These wider parts 74 and 75 are mostly beyond the upper and lower ends of the side walls 60 of the bracket 54. The wider parts 74–75 have channels 78 which provide clearance for the side walls 60 of the bracket when the bracket is adjusted to a position where part of it is beyond the front surfaces of the back portion 38 and more especially the wider parts 74–75.

FIG. 4 shows the bracket 54 adjusted to the limit of its adjustment with the rearward face of the flange 56 in contact with the front face of the back portion 38 of the housing. With the bracket in this position, the projection 48 cannot engage any of the spaces along the sawtooth edge of the side wall 60 of the bracket but it is unnecessary to hold the bracket in position by engagement with the projection 48 because in this maximum rearward position of the bracket, its flange 56 is held against rearward movement by the back portion 38 of the housing. FIG. 4 shows the flange means 30 and the bracket flange 56 at their maximum spacing from one another to accommodate the thickest wall 20b for which the invention is intended to be used.

In the preferred construction of the invention, the housing 34 is molded from stiff plastic material and the surfaces 46 (FIG. 1) are merely wider parts of the housing, as shown in FIG. 6. The projection 48 is of one piece construction with the rest of the side wall of the housing and is integral with the side wall.

FIG. 9 shows the invention applied to a switch 82 which has a housing 34' of a construction similar to that of the outlet shown in FIG. 1 but with such necessary changes in shape, particularly on the inside, as are necessary to accommodate the switch parts in contrast with the outlet socket parts of FIG. 1. The switch 82 has a manually operated actuator 84 extending from its forward face and this actuator 34 operates the contact of the switch, the construction of which forms no part of the present invention. Parts of the housing 34' which corresponds to parts of the housing 34 shown in the other Figures are indicated by the same reference characters with a prime appended. The switch has flanges 30' which extend across the front of the wall in which the switch is installed and switch 34' has a bracket 54' which is of the same construction as that already described for the bracket 54 to accommodate the switch to walls of different thicknesses.

The back portion 38 of the wall outlet and the back portion 38' of the switch have an opening at the upper end for receiving a cable 92 which contain the conductors for the terminations in the outlet fitting and in the switch.

The preferred embodiment of the invention have been illustrated and described, but changes and modifications can be made and some features can be used in different combinations without departing from the invention as defined in the claims.

What is claimed is:

1. An electrical fitting for installations in an opening in a building wall including in combination a housing that fits into said opening, flange means fixed to the front of the housing in position to extend beyond the opening and across the front surface of the wall, a bracket that fits around the housing and that is adjustable along the housing from front to back of the housing, the bracket having a flange that projects beyond the housing and across a back surface of the wall, and complementary locking means on confronting surfaces of the housing and the bracket that selectively engage one another at different adjusted positions of the bracket for accommodating the bracket to different wall thicknesses.

2. The electrical fitting described in claim 1 characterized by the bracket having portions that extend around different sides of the housing for holding the bracket on the housing, said surface of the bracket that confronts a surface of the housing extending from front to rear with respect to the housing and the opening through the wall, one of the confronting surfaces having a plurality of shoulders thereon and the other one of the confronting surfaces having an abutment that engages different shoulders to hold the bracket in different adjusted positions for walls of different thicknesses.

3. The electrical fitting described in claim 1 characterized by the bracket comprising a flat outer portion that is a flange of the bracket, and the bracket having an opening through which the housing fits, the bracket also having side walls that confront side walls of the housing to provide said confronting surfaces and that connect with the bracket flange along the edges of the opening in the bracket through which the housing fits, said side walls of the bracket being adjacent to and substantially parallel with the side walls of the housing, the means on said confronting surfaces including shoulders along edges of the flanges of the side walls and projections on the side walls of the housing extending into spaces between the shoulders on the bracket side walls.

4. The electrical fitting described in claim 3 characterized by the side walls of the bracket being integral with the flange of the bracket at their forward ends and being sufficiently flexible to bend away from the walls of the housing far enough to clear the projection on the wall of the housing to facilitate adjusting of the bracket along the housing and engagement of the projection with a different shoulder of the bracket.

5. The electrical fitting described in claim 4 characterized by the bracket being a one piece metal stamping with the side walls struck from the material displaced from the opening through which the housing extends, there being substantially parallel side walls on both sides of the opening through the bracket and each side wall being supported only by its connection to the bracket flange at the forward end of the side walls, and each side wall having sawtooth upper and lower edges with one side of each tooth substantially vertical and constituting one of the shoulders, and the housing being a molding with projections on both sides thereof in position to engage between sawteeth along the edges of the side walls of the bracket, the projections being shaped to fit the space between the sawteeth and the vertical sides of the sawteeth facing toward the flange of the bracket.

6. The electrical fitting described in claim 1 characterized by a detachable portion of the housing that holds the complementary locking means in engagement with one another, and fastening means for securing said detachable portion to the housing after the bracket has been adjusted for the thickness of the wall in which the housing is installed.

7. The electrical fitting described in claim 6 characterized by the bracket having side walls that extend along side walls of the housing adjacent thereto and substantially parallel therewith, the side walls of the bracket being movable toward and away from the housing to engage and disengage the complementary locking means to effect changes in adjustment for different thicknesses of the wall in which the housing is to be installed, the detachable portion of the housing being a back portion of the housing that fits between the side walls of the bracket at its mid-portion and that extends beyond the upper and lower ends of the side walls of the bracket, the extending part of the back portion of the housing being wider than the side walls of the housing and having channels into which the upper and lower ends of the side walls of the bracket extend to prevent said side walls of the bracket from moving apart and disengaging the locking means.

8. The electrical fitting described in claim 1 characterized by the housing having a forward portion of a depth from front to back equal to the thickest wall with which the fitting is intended to be used, a back portion of the housing wider than the front portion for at least a part of the vertical extend of the back portion, detachable fastening means by which the back portion of the housing is connected with the front portion, said back portion contacting with the back of the flange of the bracket to hold said flange against the back of the wall in which the housing is installed when that wall is of a thickness equal to the full depth of the forward portion of the housing, the range of adjustment of the complementary locking means being less than that necessary to accommodate a wall thickness equal to the full depth of the forward portion of the housing.

9. The electrical fitting described in claim 1 characterized by the electrical fitting being an outlet receptacle with sockets in the front of the housing for receiving the prongs of a drop cord fitting.

10. The electrical fitting described in claim 1 characterized by the electrical fitting having a switch with a manually operated actuator projecting through the front face of the front portion of the housing.

* * * * *